United States Patent
Liu

(10) Patent No.: US 9,411,883 B2
(45) Date of Patent: Aug. 9, 2016

(54) AUDIO SIGNAL PROCESSING APPARATUS AND METHOD, AND MONITORING SYSTEM

(71) Applicant: Sony Corporation, Minato-ku (JP)

(72) Inventor: Kun Liu, Beijing (CN)

(73) Assignee: SONY CORPORATION, Tokyo (JP)

(*) Notice: Subject to any disclaimer, the term of this patent is extended or adjusted under 35 U.S.C. 154(b) by 131 days.

(21) Appl. No.: 14/257,503

(22) Filed: Apr. 21, 2014

(65) Prior Publication Data
US 2015/0045920 A1    Feb. 12, 2015

(30) Foreign Application Priority Data
Aug. 8, 2013   (CN) .......................... 2013 1 0344110

(51) Int. Cl.
| G06F 17/00 | (2006.01) |
| G06F 17/30 | (2006.01) |
| G10L 25/51 | (2013.01) |

(52) U.S. Cl.
CPC .......... *G06F 17/30743* (2013.01); *G10L 25/51* (2013.01)

(58) Field of Classification Search
None
See application file for complete search history.

(56) References Cited

U.S. PATENT DOCUMENTS

2005/0160457 A1* 7/2005 Rui ................... G06F 17/30743
725/45

* cited by examiner

*Primary Examiner* — Fan Tsang
*Assistant Examiner* — David Siegel
(74) *Attorney, Agent, or Firm* — Oblon, McClelland, Maier & Neustadt, L.L.P.

(57) ABSTRACT

The invention discloses an audio signal processing apparatus and method and a monitoring system. The audio signal processing apparatus includes: a window dividing unit for sequentially reading an inputted audio signal using a sliding window; an energy calculating unit for calculating energy of each frame of the audio signal in each window; a segmenting unit for segmenting, according to distribution of the energy of each frame of the audio signal in each window, the audio signal in the window into multiple segments, such that each segment includes successive frames with approximate energies; a classifying unit for classifying the audio signal in each segment using at least one sound model; and a recognizing unit for recognizing a sound class of the audio signal in each segment according to a result of the classifying by the classifying unit.

14 Claims, 10 Drawing Sheets

US 9,411,883 B2

AUDIO SIGNAL PROCESSING APPARATUS AND METHOD, AND MONITORING SYSTEM

FIELD OF THE INVENTION

The invention generally relates to the field of audio processing, and particularly to an audio signal processing apparatus and method and a monitoring system.

BACKGROUND OF THE INVENTION

An important issue in the field of audio processing is to process an audio signal to accurately recognize sound classes in the audio signal so as to extract a particular audio event. Segmenting the audio signal into successive segments is the basis of the audio signal recognition. The segmenting effect of the audio signal directly affects the accuracy of the audio signal recognition. How to improve the audio signal segmenting technology so as to improve the accuracy of the segmenting and to avoid excessive false segmenting points, large computing capacity, high false detection rate and missing detection rate is an important aspect of research in this field.

SUMMARY OF THE INVENTION

A brief overview of the invention is given hereinafter in order to provide basic understanding regarding some aspects of the invention. It should be understood that this overview is not an exhaustive overview of the invention. It is neither intended to determine the key or critical part of the invention, nor intended to limit the scope of the invention. Its purpose is to merely give some concepts in a simplified form as a prelude to the more detailed description that is discussed later.

The object of the invention is to provide an audio signal processing apparatus and method and a monitoring system to overcome at least one of the above problems in the prior art.

According to an aspect of the invention, there is provided an audio signal processing apparatus including: a window dividing unit for sequentially reading an inputted audio signal using a sliding window; an energy calculating unit for calculating energy of each frame of the audio signal in each window; a segmenting unit for segmenting, according to distribution of the energy of each frame of the audio signal in each window, the audio signal in the window into multiple segments, such that each segment includes successive frames with approximate energies; a classifying unit for classifying the audio signal in each segment using at least one sound model; and a recognizing unit for recognizing a sound class of the audio signal in each segment according to a result of the classifying by the classifying unit.

According to another aspect of the invention, there is provided an audio signal processing method, including: sequentially reading an inputted audio signal using a sliding window; calculating energy of each frame of the audio signal in each window; segmenting, according to distribution of the energy of the each frame of the audio signal in each window, the audio signal in the window into multiple segments, such that each segment includes successive frames with approximate energies; classifying the audio signal in each segment using at least one sound model; and recognizing a sound class of the audio signal in each segment according to a result of the classifying.

According to still another aspect of the invention, there is provided a monitoring system including: an audio collecting apparatus for collecting an audio signal; an audio signal processing apparatus for processing the audio signal, so as to recognize sound classes included in the audio signal; and an alerting apparatus for generating and transmitting alert information when the audio signal processing apparatus recognizes that the audio signal includes a sound class of a predetermined type, wherein the audio signal processing apparatus is the audio signal processing apparatus according to the above aspects of the invention.

In the audio signal processing apparatus and method and the monitoring system according to the above aspects of the invention, the audio signal in each window is segmented into multiple segments according to distribution of the energy of each frame of the audio signal in the window such that each segment includes successive frames with approximate energies, and the audio signal in each segment is classified. In this way, the audio signal can be front-end segmented rapidly, without previously training a sound model for the segmenting, and since each segment includes successive frames with approximate energies, the sound class included in each segment is relatively single, thereby facilitating the improvement of accuracy of the subsequent audio signal recognition.

BRIEF DESCRIPTION OF THE DRAWINGS

The invention can be better understood from the description given hereinafter in conjunction with drawings, and the same or similar parts are denoted by the same or similar reference numerals throughout the drawings. The drawings together with the following detailed description are contained in the specification as a part of the specification, and are used to further illustrate the preferred embodiments of the invention and explain the principles and advantages of the invention. In the drawings.

DETAILED DESCRIPTION OF THE INVENTION

Figure 1:
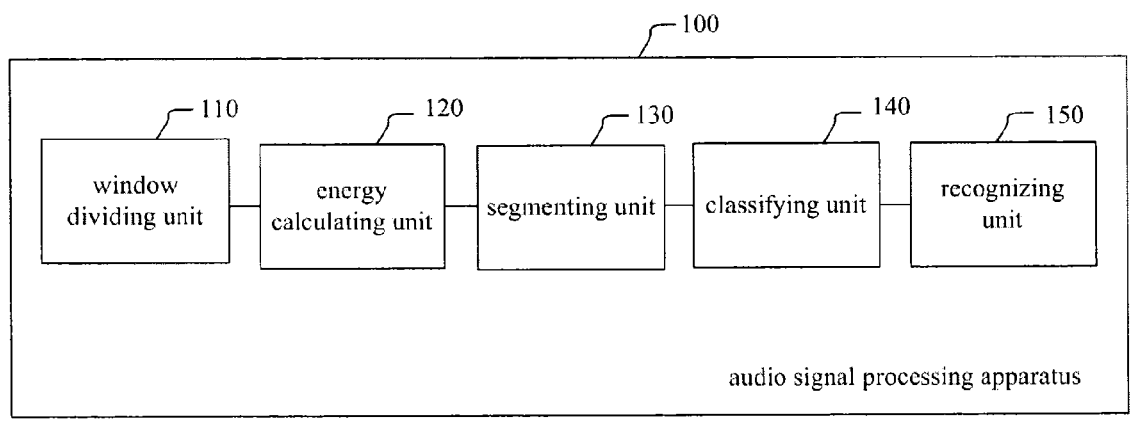
FIG. 1 shows a schematic block diagram of an audio signal processing apparatus according to an embodiment of the invention.

The embodiments of the invention will be described hereinafter with reference to the drawings. Elements and features described in one drawing or embodiment of the invention can be combined with elements and features described in another drawing or embodiment of the invention. It should be noted that, for purposes of clarity, representations and descriptions on components and processes that are unrelated to the invention and that have been known to those skilled in the art are omitted in the drawings and descriptions.

FIG. 1 shows a schematic block diagram of an audio signal processing apparatus according to an embodiment of the invention. As shown in FIG. 1, an audio signal processing apparatus 100 includes a window dividing unit 110, an energy calculating unit 120, a segmenting unit 130, a classifying unit 140 and a recognizing unit 150. A schematic operation flowchart of the audio signal processing apparatus 100 may be described below in conjunction with FIG. 2.

Figure 2:
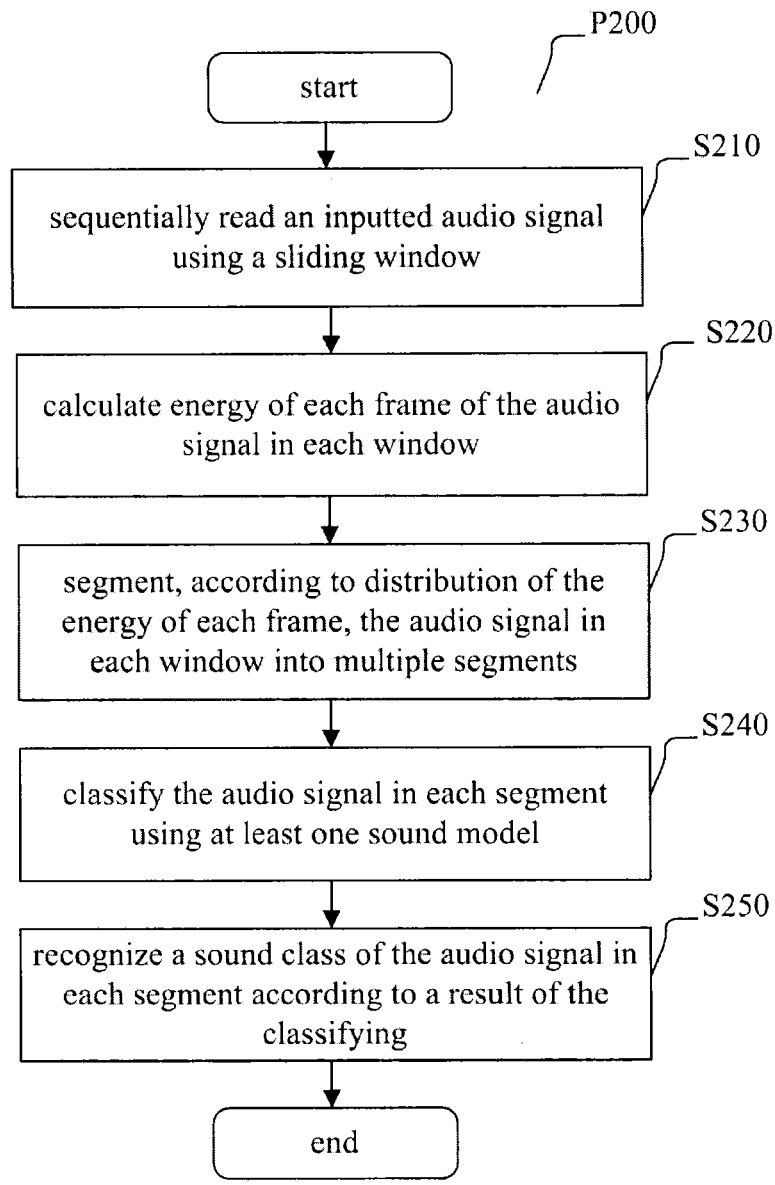
FIG. 2 shows a schematic operation flowchart of the audio signal processing apparatus shown in FIG. 1.

FIG. 2 shows a schematic operation flowchart of the audio signal processing apparatus 100 shown in FIG. 1, i.e. an audio signal processing method according to an embodiment of the invention. As shown in FIG. 2, in a method P200, in step S210, an inputted audio signal is sequentially read using a sliding window. By taking each window of signal as a processing unit of subsequent operations such as segmenting, classifying and recognizing, each window of the audio signal is sequentially processed. In step S220, energy of each frame of the audio signal in each window is calculated. Frame is a basic unit of the audio signal, and each frame of the audio signal has a predetermined time length. In step S230, the audio signal in each window is segmented into multiple segments according to distribution of energy of each frame of the audio signal in the window, such that each segment includes successive frames with approximate energies. That is to say, the change of energies of frames in each segment is relatively flat. In step S240, the audio signal in each segment is classified using at least one sound model. The sound model may be a pre-trained model, and each sound model corresponds to a respective sound class. The degree of similarity (e.g., the likelihood value or score) of the audio signal in each segment with respect to the at least one sound model is determined by classifying, to serve as a result of the classifying. In this embodiment, there is no limitation to the employed specific classification method. For example, the sound model may be used to classify a characteristic parameter of the entire audio signal of each segment, so as to obtain a classification result of this segment; alternatively, the sound model may be used to classify a characteristic parameter of each frame of the audio signal in each segment, and the classification result of this segment is be determined according to the classification results of respective frames in the segment. In step S250, the sound class of the audio signal in each segment is recognized according to the classification result. Specifically, if the audio signal has a higher degree of similarity with respect to a certain sound model, then it is determined that the audio signal belongs to a sound class corresponding to the certain sound model. Here, step S210 may be performed by the window dividing unit 110, step S220 may be performed by the energy calculating unit 120, step S230 may be performed by the segmenting unit 130, step S240 may be performed by the classifying unit 240, and step S250 may be performed by the recognizing unit 150.

Thus, the audio signal can be front-end segmented rapidly, without previously training a sound model for the segmenting. Successive frame having relatively approximate energies can be considered to have the same class, successive frames having larger energy differences therebetween are considered to have different classes. Since each segment includes successive frames with approximate energies, the sound class included in each segment is relatively single, thereby facilitating the improvement of accuracy of the subsequent audio signal recognition.

It should be understood that in the method P200, the timing for performing the energy calculation step S220 is not limited to that shown in FIG. 2, but the calculation for energy of each frame in the audio signal may also be performed before the window dividing step S210.

The window dividing unit 110 may use any appropriate existing techniques or any appropriate techniques to be developed to move the sliding window on the inputted audio signal (the window dividing operation). For example, a sliding window with a predetermined fixed-length may be used to read the audio signal. Alternatively, a sliding window with a variable length may be used to read the audio signal.

As an example of a sliding window with a variable length, the window dividing unit 110 can take a predetermined number of frames as the length of an initial sliding window, slide the sliding window by increasing a fixed step length (fixed number of frames) each time and taking the back boundary of the initial sliding window as a center, to look for the minimum extreme points of an energy envelope of the audio signal as the front boundary of the next window. In order to prevent false judgments caused by disturbance, the minimum extreme point does not include extreme points generated by slight disturbance. Here, the one in the two boundaries of the sliding window which is at the front in time is called a front boundary, and the one in the two boundaries of the sliding window which is at the back in time is called a back boundary.

The energy calculating unit 120 may use various appropriate methods to calculate the energy of each frame of the audio signal. For example, the following equation may be used to calculate the energy of one frame of the audio signal:

$$E(i) = \log\left(1 + \sum_{j=0}^{M} S_{(i*N+j)^2}\right) \quad \text{(Equation 1)}$$

In the above equation, i is the frame number of the current frame; N is the size of a frame shift, i.e. the number of sampling points contained in an overlapping portion of adjacent frames; M is the total number of sampling points in one frame, which depends on a frame length and an encoding rate of the audio signal; j represents the number of a sampling point in a frame, which is also known as a local number; and $S_{(i*N+j)}$ represents the amplitude of a sample point in the audio signal which has a global number (i*N+j).

In order to rapidly and accurately segment the audio signal, the segmenting unit 130 segments the audio signal in each window into segments each of which includes successive frames with approximate energies according to distribution of energy of each frame of the audio signal in the window.

Figure 3:
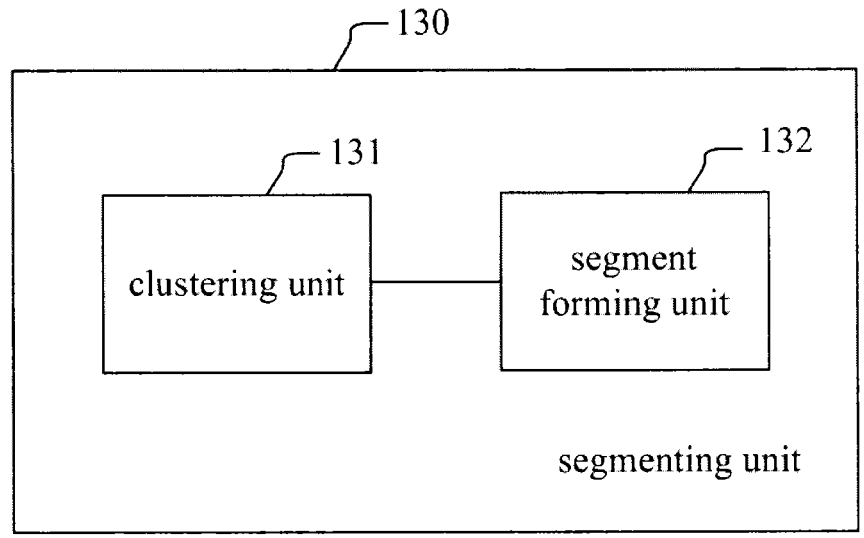
FIG. 3 shows a schematic block diagram of a segmenting unit according to an embodiment of the invention.
Figure 4:
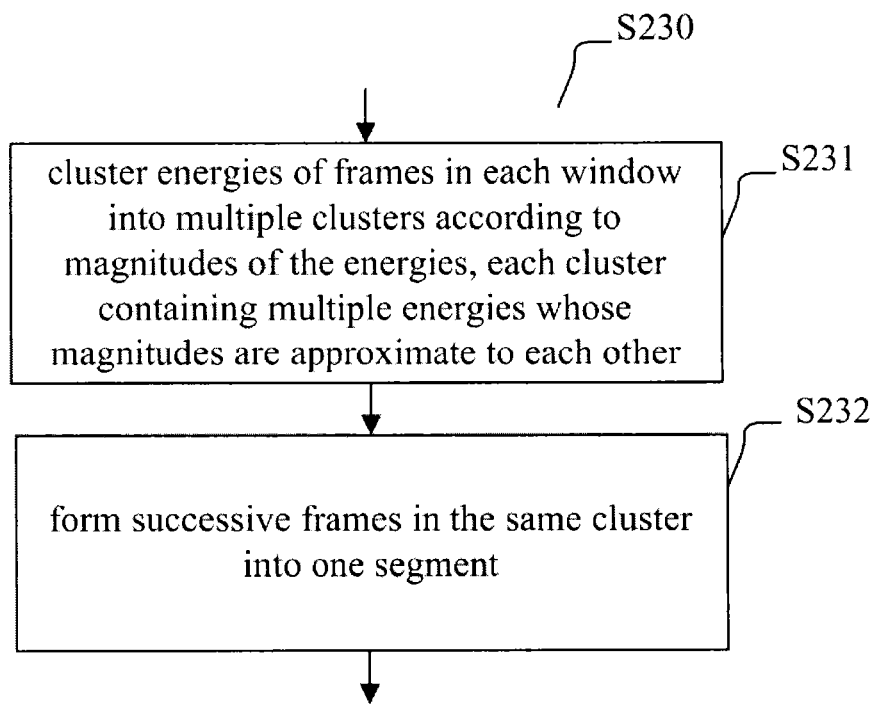
FIG. 4 shows a schematic operation flowchart of the segmenting unit shown in FIG. 3.

FIG. 3 shows a schematic block diagram of a segmenting unit according to an embodiment of the invention. In FIG. 3, the segmenting unit 130 includes a clustering unit 131 and a segment forming unit 132. FIG. 4 shows a schematic operation flowchart of the segmenting unit shown in FIG. 3. Specifically, step S230 includes: a step S231 which may be performed by the clustering unit 131 for clustering energies of frames in each window into multiple clusters according to magnitudes of the energies, each cluster containing multiple energies whose magnitudes are approximate to each other; and a step S232 which may be performed by the segment forming unit 132 for forming successive frames in the same cluster into one segment.

In a clustering example, the clustering unit 131 clusters an energy sequence of the window into two clusters according to a Nearest Neighbor Rule by taking a maximum energy and a minimum energy in the energy sequence of the window as centers, respectively, and iteratively clusters an energy sequence of each cluster according to the Nearest Neighbor Rule by taking a maximum energy and a minimum energy in the energy sequence of each cluster as centers, respectively, until a clustering condition is not satisfied any longer. If the two clusters resultant from the current clustering do not satisfy the clustering condition, the current clustering is withdrawn. The clustering condition is that the sum of degrees of similarity between distributions of the energy sequences of the two clusters resultant from the clustering and Single Gaussian Distribution is higher by up to a predetermined extent than a degree of similarity between distribution of an energy sequence of a window or cluster from which the two clusters are clustered and the Single Gaussian Distribution. Alternatively, the clustering condition is that the sum of the extents that the energy sequences of the two clusters resultant from the clustering follow Single Gaussian Distribution is higher by up to a predetermined extent than the extent that the energy sequence of the window or cluster from which the two clusters are clustered follows the Single Gaussian Distribution. The sequence composed of energies of frames in each window may be called energy sequence of this window, and the sequence composed of energies of frames in each cluster may be called energy sequence of this cluster. The Nearest Neighbor rule means that an energy in the energy sequence is classified into a cluster which takes one of the maximum energy and the minimum energy that the magnitude of the energy is more close to, as a center.

When the degrees of similarity between distributions of energy sequences of two clusters resultant from the clustering and the Single Gaussian Distribution are higher than the degree of similarity between distribution of the window or cluster from which the two clusters are clustered and the Single Gaussian Distribution, it indicates that the approximation degree between energies of the frames in the two clusters resultant from this clustering is higher than the approximation degree between energies of the frames in the window or cluster from which the two clusters are clustered, and the sound class included in a segment formed from the two clusters will be more single.

It should be understood that, when the clustering is performed on the energy sequence, it is not limited to take the maximum energy and the minimum energy as energy centers, and more energy centers with different magnitudes may also be set finely to perform clustering. Accordingly, the clustering condition may also be adjusted to that the sum of the degrees of similarity between distributions of energy sequences of the multiple clusters resultant from the clustering and the Single Gaussian Distribution is higher by up to a predetermined extent than the degree of similarity between distribution of energy sequences of the window or cluster from which the multiple clusters are clustered and the Single Gaussian Distribution. Further, for the distribution of the energy sequence, it is not limited to perform fitting using the single Gaussian distribution, other distributions similar to the Single Gaussian Distribution may also be used to perform fitting.

Figure 5:
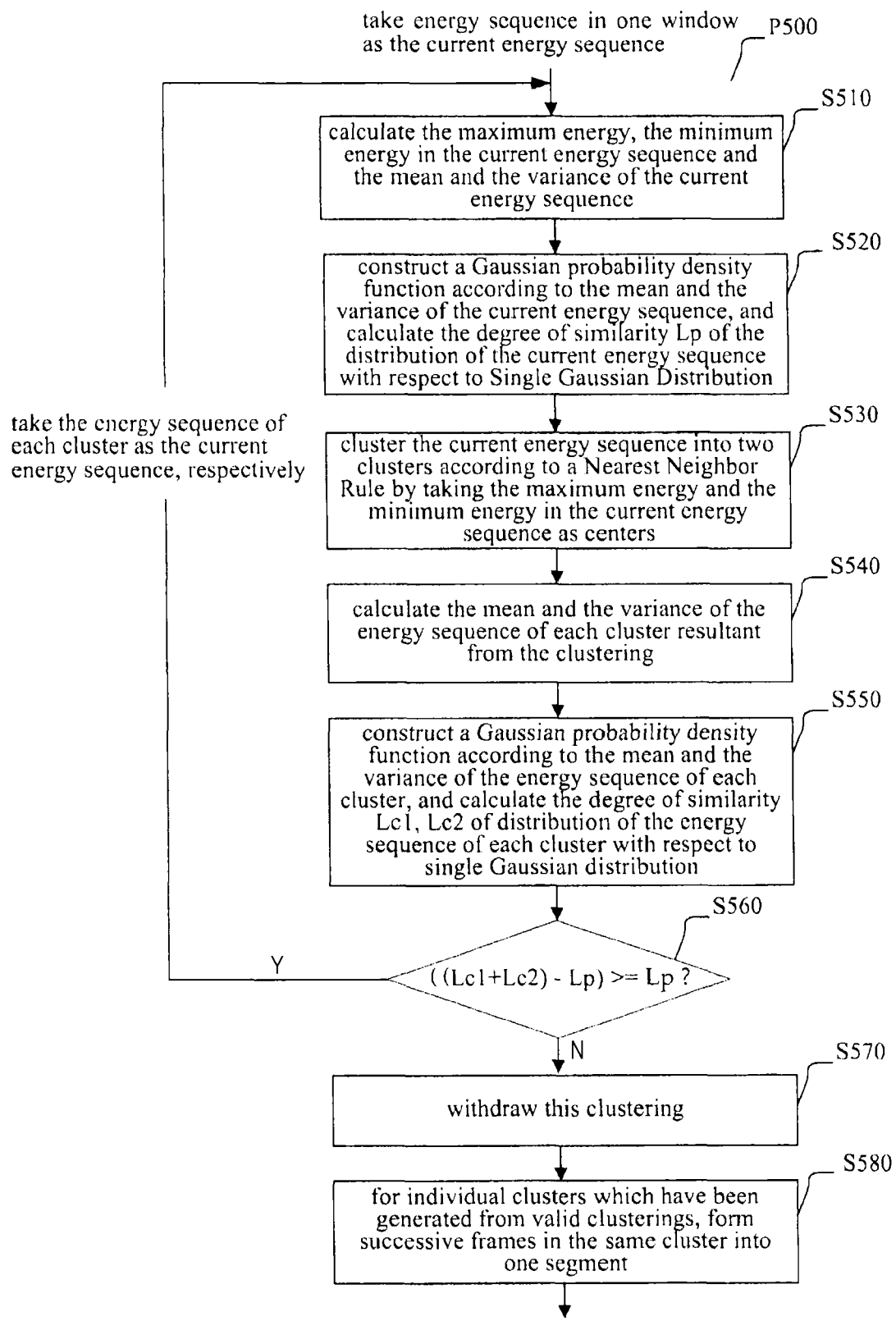
FIG. 5 shows a schematic flowchart of an example of a segmenting process according to an embodiment of the invention.

An example of a segmenting process according to an embodiment of the invention is described hereinafter in conjunction with FIG. 5. In the example of FIG. 5, an audio signal in one window is segmented.

As shown in FIG. 5, in a method P500, the segmenting process is started by taking the energy sequence in the window as the current energy sequence. In step S510, a maximum energy and a minimum energy in the current energy sequence and the mean and variance of the current energy sequence are calculated.

In step S520, a Gaussian distribution probability density function is constructed according to the mean and variance of the current energy sequence, and a degree of similarity Lp between distribution of the current energy sequence and the Single Gaussian Distribution is calculated. More specifically, the Gaussian distribution probability density function may be constructed by using the mean and variance of the current energy sequence as a mathematical expectation and variance, and the Gaussian distribution probability density function represents a Single Gaussian Distribution corresponding to the current energy sequence. The probability of each element in the current energy sequence is calculated using this Gaussian distribution probability density function, and the sum of the probabilities of all elements in the current energy sequence is used as a degree of similarity Lp between the distribution of the current energy sequence and the Single Gaussian Distribution.

In step S530, the current energy sequence is clustered into two clusters c1 and c2 (two classes) according to a Nearest Neighbor Rule by taking a maximum energy and a minimum energy in the current energy sequence as centers.

In step S540, the mean and variance of the energy sequence of each cluster resultant from the clustering are calculated.

In step S550, the Gaussian distribution probability density function is constructed according to the mean and variance of the energy sequence of each cluster, and degrees of similarity Lc1 and Lc2 between distributions of the energy sequences of the two clusters c1 and c2 and the Single Gaussian Distribution are calculated respectively. More specifically, for each cluster c1 or c2, the Gaussian distribution probability density function may be constructed by taking the mean and variance of the energy sequence of the cluster as a mathematical expectation and variance, and this Gaussian distribution probability density function represents a Single Gaussian Distribution corresponding to the energy sequence of this cluster. The probability of each element in the energy sequence of the cluster is calculated using this Gaussian distribution probability density function, and the sum of probabilities of all elements in the energy sequence is used as a degree of similarity between the distribution of the energy sequence of this cluster and the Single Gaussian Distribution.

In step S560, it is judged whether a difference between the sum of degrees of similarity Lc1 and Lc2 and the degree of similarity Lp is greater than or equal to a predetermined threshold Lth.

If $((Lc1+Lc2)-Lp) \geq Lth$, it indicates that this clustering satisfies the clustering condition, and the process proceeds to S510 to perform the next level of clustering by taking the energy sequence of each cluster resultant from the clustering as the current energy sequence, respectively.

Otherwise, it indicates that this clustering does not satisfy the clustering condition, and the process proceeds to step S570 to withdraw this clustering. Then, in step S580, for the individual clusters that have been generated from valid clustering, successive frames in the same cluster are formed into one segment, thereby segmenting the audio signal in the window into multiple segments.

The above example is merely for the purpose of illustration and not for limitation. For example, as another example of a method for determining a degree of similarity between distribution of the energy sequence and the Single Gaussian Distribution, the mean of the energy sequence can be firstly calculated, and a distribution curve of energy values in the energy sequence is plotted by taking the mean of the energy sequence as a center. The distribution curve is compared in shape with any appropriate Single Gaussian Distribution curve such as a standard Gaussian distribution curve, and the degree of similarity between the distribution of the energy sequence and the Single Gaussian Distribution is determined according to a degree of similarity in shape. From the above examples, those skilled in the art can consider more methods for determining the degree of similarity between the distribution of the energy sequence and the Single Gaussian Distribution, which will not be described herein in detail.

Figure 6:
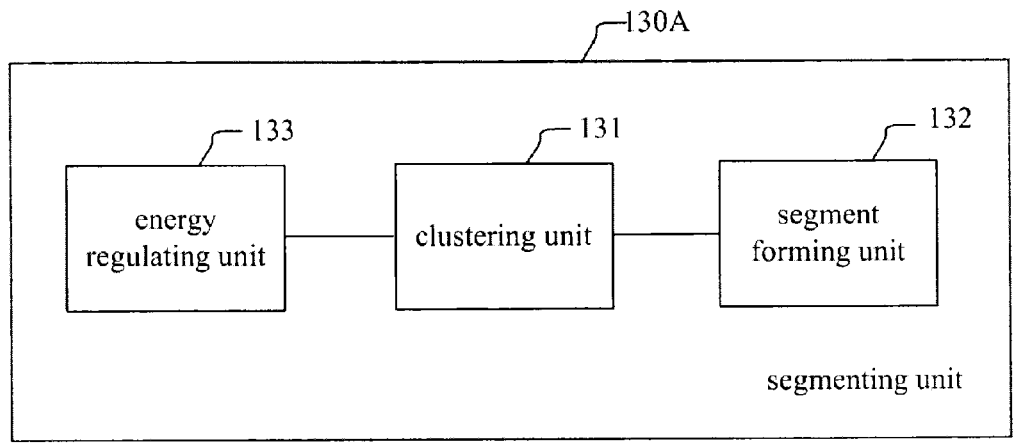
FIG. 6 shows a schematic block diagram of a segmenting unit according to another embodiment of the invention.

According to an embodiment of the invention, before the clustering unit 131 performs clustering, a sequence composed of energies of frames in a window can be regulated to increase differences between energies in the sequence. FIG. 6 shows a schematic block diagram of a segmenting unit according to this embodiment. Compared with the segmenting unit 130 shown in FIG. 3, the segmenting unit 130A in FIG. 6 further includes an energy regulating unit 133 for performing the regulating operation described above. The energy regulating unit 133 can perform energy regulation using any existing appropriate method. As an example, the energy regulating unit 133 may use the following equation to regulate the energy sequence of one window:

$$\hat{E}(i) = \begin{cases} e^{\left(\frac{E(i)-E_{min}}{E_{max}-E_{min}}\right)^2 / \sigma}, & \text{if } (E_{max} - E_{min}) > 0.1 * E_{max} \\ e^{\frac{E(i)^2}{\sigma}} & \text{otherwise} \end{cases} \quad \text{(Equation 2)}$$

where i is the index of a frame, i.e. a frame number; $E_{max}$ is a maximum energy in the energy sequence; $E_{min}$ is a minimum energy in the energy sequence; $E(i)$ is the energy of a frame i before regulation; $\hat{E}(i)$ is the energy of a frame i after regulation; $\sigma$ is a scale parameter and is an empirical value.

In practical applications, abnormal sound detection or recognition is an important application of the audio signal recognition. For example, in some unattended environments, a monitoring device is required to detect or recognize abnormal sounds such as gunshots, screams, sound of broken glass, and to transmit alert information. However, since the acoustic characteristic of the abnormal sound is often similar to the ambient noise, it is prone to generate false alerts or missing detection. In order to reduce the false alerting rate and the missing detection rate in the abnormal sound detection, in another embodiment of the invention, the classification result by the classifying unit 140 is weighted.

Figure 7:
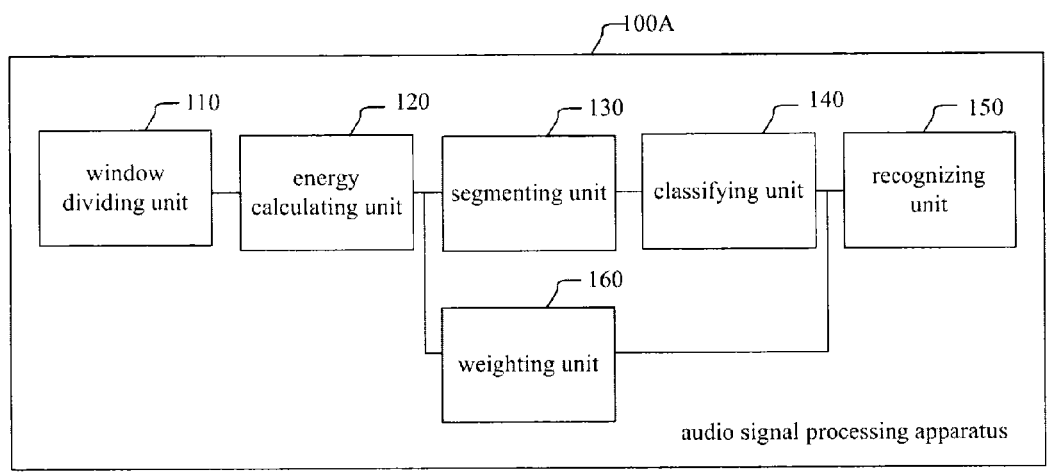
FIG. 7 shows a schematic block diagram of an audio signal processing apparatus according to another embodiment of the invention.

FIG. 7 shows a schematic block diagram of an audio signal processing apparatus according to another embodiment of the invention 7. As shown in FIG. 7, in addition to the window dividing unit 110, the energy calculating unit 120, the segmenting unit 130, the classifying unit 140 and the recognizing unit 150 shown in FIG. 1, the audio signal processing apparatus 100A further includes a weighting unit 160.

Figure 8:
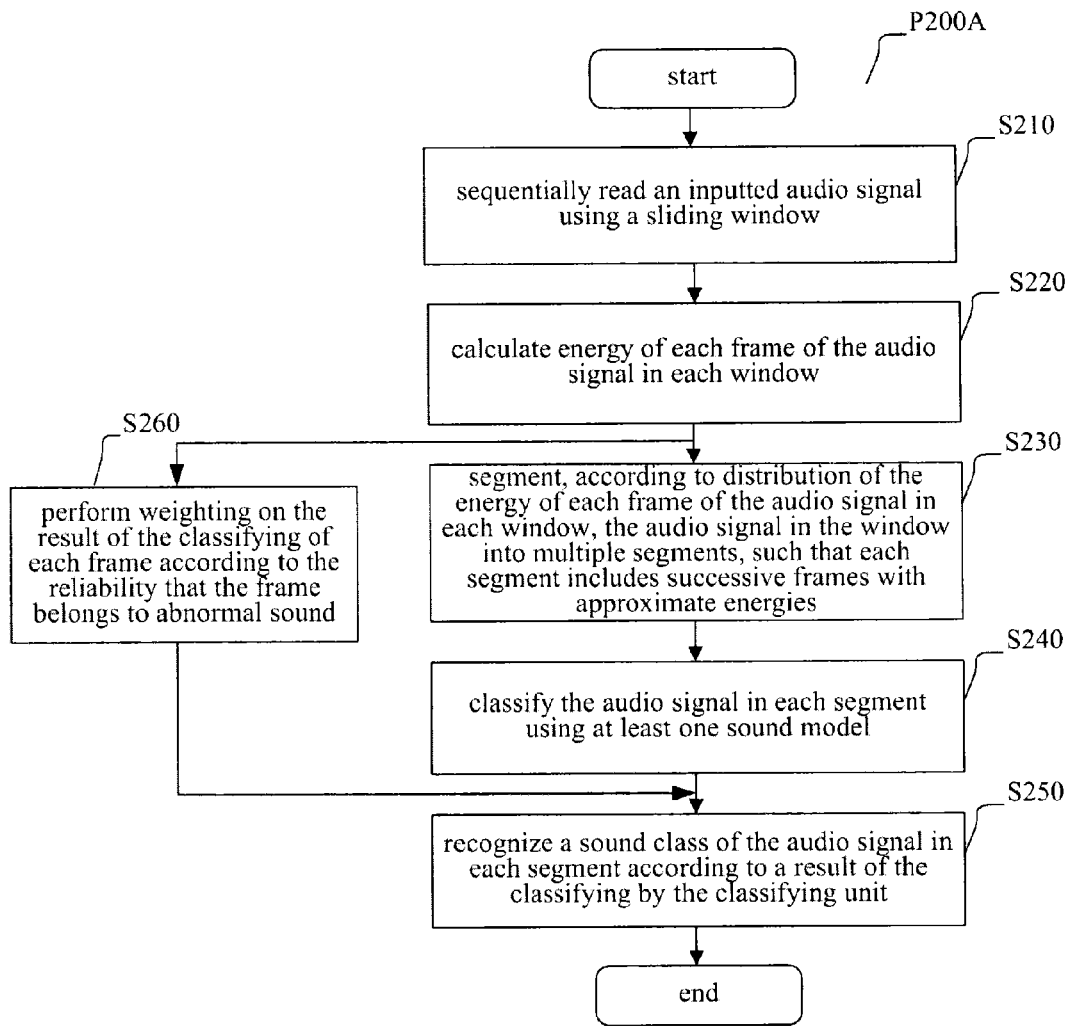
FIG. 8 shows a schematic operation flowchart of the audio signal processing apparatus shown in FIG. 7.

Here, more specifically, the classifying unit 140 uses an abnormal sound model and a background model to classify each frame of the audio signal in each segment. The weighting unit 160 performs weighting on the classification result for each frame by the classifying unit 140 according to a reliability that each frame belongs to abnormal sound. If the reliability is larger, then the weight of the classification result is greater. As an example, the reliability that each frame belongs to abnormal sound may be directly used as the weight of the classification result of this frame. Accordingly, the recognizing unit 150 recognizes a sound class of the audio signal in each segment according to the weighted classification result of each frame. FIG. 8 shows a schematic operation flowchart of the audio signal processing apparatus shown in FIG. 7, i.e., an audio signal processing method according to another embodiment of the invention. In this method P200A, step S260 describes the function performed by the weighting unit 160 described above. The step S260 may be performed in parallel with the segmenting step S230 and the classifying step S240 as shown in the figure, and may also be performed before the step S230, S240 or S250.

The analysis shows that, in terms of energy, if the change in energies of adjacent frames is larger, then the possibility that abnormal sound occurs is greater. Thus, in one embodiment of the invention, the weighting unit 160 uses the energy change of each frame of the audio signal with respect to a previous frame of the audio signal as the reliability that each frame belongs to the abnormal sound. For example, the weighting unit 160 may use the following equation to calculate the reliability that each frame belongs to abnormal sound, and use the reliability as the weight of the classification result of this frame:

$$w(i)=|E(i)-E(i-1)|/E(i-1) \quad \text{Equation (3)}$$

In this equation, i is the index of a frame in a segment, i.e. a frame number; $E(i)$ is the energy of a frame i; $E(i-1)$ is the energy of a previous frame $i-1$ of the frame i. For the start frame in the segment, the energy of its previous frame may be the energy of the last frame in the previous adjacent segment.

By analyzing the degree of similarity of the characteristics of signals of each frame with respect to the abnormal sound model and the background sound model, it is found that most false alerts occur in a situation that the degree of similarity with respect to the abnormal sound model is very close to the degree of similarity with respect to the background sound model. That is to say, if the two degrees of similarity are very close, the possibility that the false alert occurs is greater, and the sound model has less distinction; on the contrary, if the difference between the two degrees of similarity is larger, the possibility that the false alert occurs is less, and the sound model has a stronger distinction. Thus, in one embodiment of the invention, the weighting unit 160 may use a difference between the degree of similarity between each frame of the audio signal and the abnormal sound model and the degree of similarity between each frame of the audio signal and the background sound model as the reliability that each frame belongs to the abnormal sound. Specifically, the degree of similarity between each frame of the audio signal and the abnormal sound model refers to a degree of similarity between a feature of each frame of the audio signal and the abnormal sound model, and the degree of similarity between each frame of the audio signal and the background sound model refers to a degree of similarity between a feature of each frame of the audio signal and the background sound model. The feature of the audio signal is not defined herein, and any appropriate feature of the audio signal and corresponding abnormal sound model and background sound model may be used. For example, the weighting unit 160 may use the following equation to calculate the reliability that each frame belongs to the abnormal sound, and use the reliability as the weight of the classification result of this frame:

$$w(i) = \begin{cases} |L_{BG}(i) - L_T(i)|, & \text{if } |L_{BG}(i) - L_T(i)| < 1 \\ 1, & \text{otherwise} \end{cases}, \text{ or} \quad \text{(Equation 4)}$$

$$w(i) = \begin{cases} (L_{BG}(i) - L_T(i)), & \text{if } (L_{BG}(i) - L_T(i)) < 1 \\ 1, & \text{otherwise} \end{cases} \quad \text{(Equation 5)}$$

where i is the index of a frame in a segment, i.e. a frame number; $L_T(i)$ represents a degree of similarity between a feature of a frame i and an abnormal sound model T, and $L_{BG}(i)$ represents a degree of similarity between a feature of a frame i and a background sound model BG.

Further, it is also found by analysis that if the number of consecutive frames contained in one segment is less, the possibility that the frames belong to burst noises is larger and the possibility that the frames belong to the abnormal sound is less. On the contrary, if the continuity of frames in a segment is stronger, i.e. the number of successive frames contained in this segment is larger, then the possibility that the frames belong to abnormal sound is larger. Thus, in one embodiment of the invention, the weighting unit 160 may use the number of successive frames contained in the segment where each frame lies as the reliability that each frame belongs to the abnormal sound. Accordingly, the weighting unit 160 may set the weight of the classification result of each frame to be a value corresponding to the number of successive frames contained in the segment where the frame belongs to. For example, if the number of successive frames in a segment is 1, then the weight of frames in the segment is determined to be −0.2; if the number of successive frames in a segment is 2, then the weight of frames in the segment is determined to be −0.1; if the number of successive frames in a segment is 3, then the weight of frames in the segment is determined to be 1; and if the number of successive frames in a segment is greater than 3, then the weight of frames in the segment is determined to be 1+0.1*L, where L is the number of successive frames in the segment.

The reliabilities that each frame belongs to the abnormal sound in the embodiment described above may be used in combination. For example, the weighting unit 160 may use a combination of the energy change of each frame of the audio signal with respect to the previous frame of the audio signal and a difference between the degree of similarity between each frame of the audio signal and the abnormal sound model and the degree of similarity between each frame of the audio signal and the background sound model as the reliability that each frame belongs to the abnormal sound. As an example, the weighting unit 160 may use the following equation to calculate the reliability that each frame belongs to the abnormal sound and uses the reliability as the weight of the classification result of this frame:

$$w(i) = \begin{cases} \text{delta\_E}(i) * (-\text{delta\_L}(i)), & \text{if } \theta_2 < \text{delta\_L}(i) < \theta_1, \\ \text{delta\_E}(i) * |\text{delta\_L}(i)|, & \text{if delta\_L}(i) <= \theta_2, \\ \text{delta\_E}(i), & \text{if delta\_L}(i) <= \theta_1 \end{cases} \quad \text{(Equation 6)}$$

where i is the index of a frame in a segment, i.e. a frame number; delta_E (i) represents the energy change of a frame i with respect to an adjacent frame, and delta_E (i)=|E (i)−E (i−1)|/E(i−1); E(i) and E(i−1) respectively represent the energy of a frame i and the energy of a previous frame i−1; delta_L (i) represents a difference between a degree of similarity $L_T$ (i) of a frame i with respect to an abnormal sound model T and a degree of similarity $L_{BG}$ (i) of the frame i with respect to a background sound model BG, and delta_L (i)=LBG (i)−LT (i); and $\theta_1$ and $\theta_2$ are two predetermined thresholds which are empirical values, and in this example, which may be set as for example $\theta_1$=1, $\theta_2$=−5.

Accordingly, the recognizing unit 150 recognizes the sound class of the audio signal in each segment according to the weighted classification result of each frame. For example, it is assumed that there are three abnormal sound models (T1, T2, T3) and one background sound model (BG). For the abnormal sound model T1, the recognizing unit 150 may use the following equation to calculate the weighted degree of similarity of the segment with respect to the sound model T1:

$$\bar{L}_{T1} = \sum_{i=0}^{M} w(i) * L_{T1}(i) \quad \text{(Equation 7)}$$

where i is the index of a frame in a segment, i.e., a frame number; $L_{T1}(i)$ represents a degree of similarity between a feature of a frame i and an abnormal sound model T1, i.e., a classification result of a frame i; w(i) represents the weight of the classification result of a frame i; and M represents the total number of frames contained in the segment.

Similarly, the weighted degrees of similarity $\bar{L}_{T2}, \bar{L}_{T3}, \bar{L}_{BG}$ of the segment with respect to the sound models T2, T3 and BG may be calculated. Then, the recognizing unit 150 compares the degrees of similarity $\bar{L}_{T1}, \bar{L}_{T2}, \bar{L}_{T3}, \bar{L}_{BG}$, and determines the sound class which is represented by the sound model corresponding to the maximum weighted degree of similarity as the sound class of the audio signal in this segment.

In the above example, the recognizing unit 150 recognizes the sound class of the audio signal in the segment by calculating the sum of the weighted classification results of individual frames in the segment. This example is for the purpose of illustration and not for limitation, and the weighted classification results of individual frames may also be used in other ways. For example, in another example, the recognizing unit 150 may recognize the sound class of the audio signal in the segment by calculating the weighted mean of the classification result of each frame in the segment. That is, the weighted degree of similarity of the segment with respect to for example the sound model T1 can be modified as:

$$\bar{L}_{T1} = \frac{\sum_{i=0}^{M} w(i) * L_{T1}(i)}{\sum_{i=0}^{M} w(i)} \quad \text{(Equation 8)}$$

where i is the index of a frame in a segment, i.e., a frame number; $L_{T1}(i)$ represents a degree of similarity between a feature of a frame i and an abnormal sound model T1, i.e., a classification result of the frame i; w (i) represents the weight of the classification result of the frame i; and M represents the total number of frames contained in the segment.

Similar to the equation 8, the weighted degrees of similarity $\bar{L}_{T2}, \bar{L}_{T3}, \bar{L}_{BG}$ of the segment with respect to the sound models T2, T3 and BG may be calculated. Then, the recognizing unit 150 compares the degrees of similarity $\bar{L}_{T1}, \bar{L}_{T2}, \bar{L}_{T3}$ and $\bar{L}_{BG}$, and determines the sound class which is represented by the sound model corresponding to the maximum weighed degree of similarity as the sound class of the audio signal in this segment.

One sound class is detected for each segment, which may reduce the disturbance introduced by signal mutation. Further, since the distinction between weighted classification results is large, the accuracy of the audio signal recognition is improved and the false alerts and missing detection situations are reduced.

Figure 9:
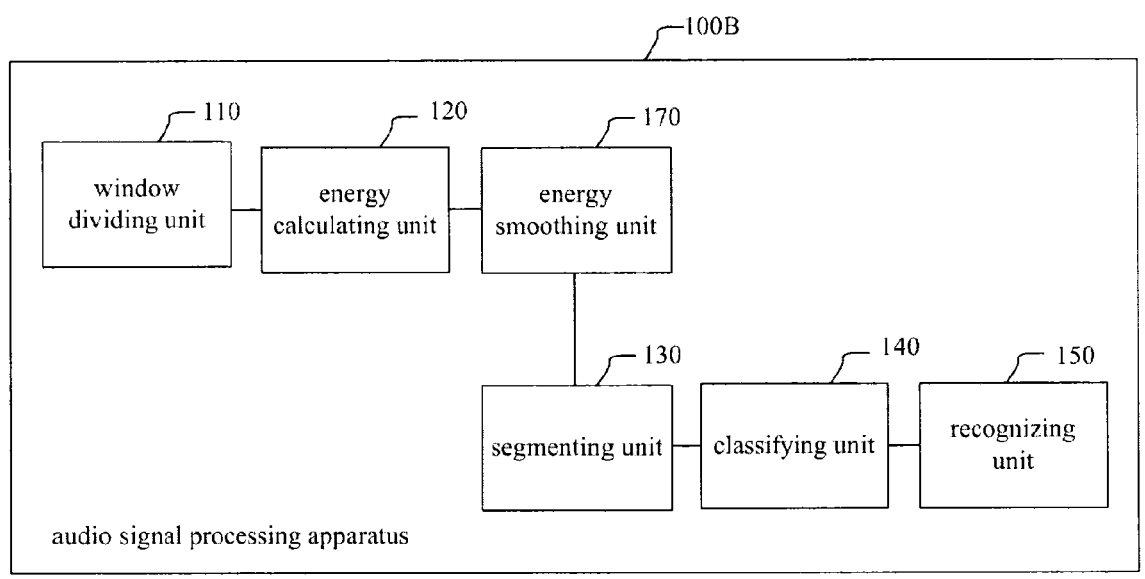
FIG. 9 shows a schematic block diagram of an audio signal processing apparatus according to still another embodiment of the invention.

FIG. 9 shows a schematic block diagram of an audio signal processing apparatus according to still another embodiment of the invention. In this embodiment, in addition to the window dividing unit 110, the energy calculating unit 120, the segmenting unit 130, the classifying unit 140 and the recognizing unit 150 shown in FIG. 1, the audio signal processing apparatus 100B further includes an energy smoothing unit 170 for smoothing the energy of each frame of the audio signal in a sliding window before segmenting the audio signal in the sliding window, to eliminate the effects of energy mutation points to the segmenting. The audio signal processing apparatus 100B may also include a weighting unit 160 (not shown) to perform the function of the weighting unit 160 shown in FIG. 7, and the description thereof is omitted here.

As an example, the energy smoothing unit 170 may use the following equation to smooth the energy:

$$\bar{E}(i) = \frac{1}{2K+1} \sum_{k=0}^{k=K} E(i+k) \qquad \text{(Equation 9)}$$

where i is the index of a frame i, i.e. a frame number; k is the index of the frame i in a smoothing window; and K is the width of the smoothing window.

Figure 10:
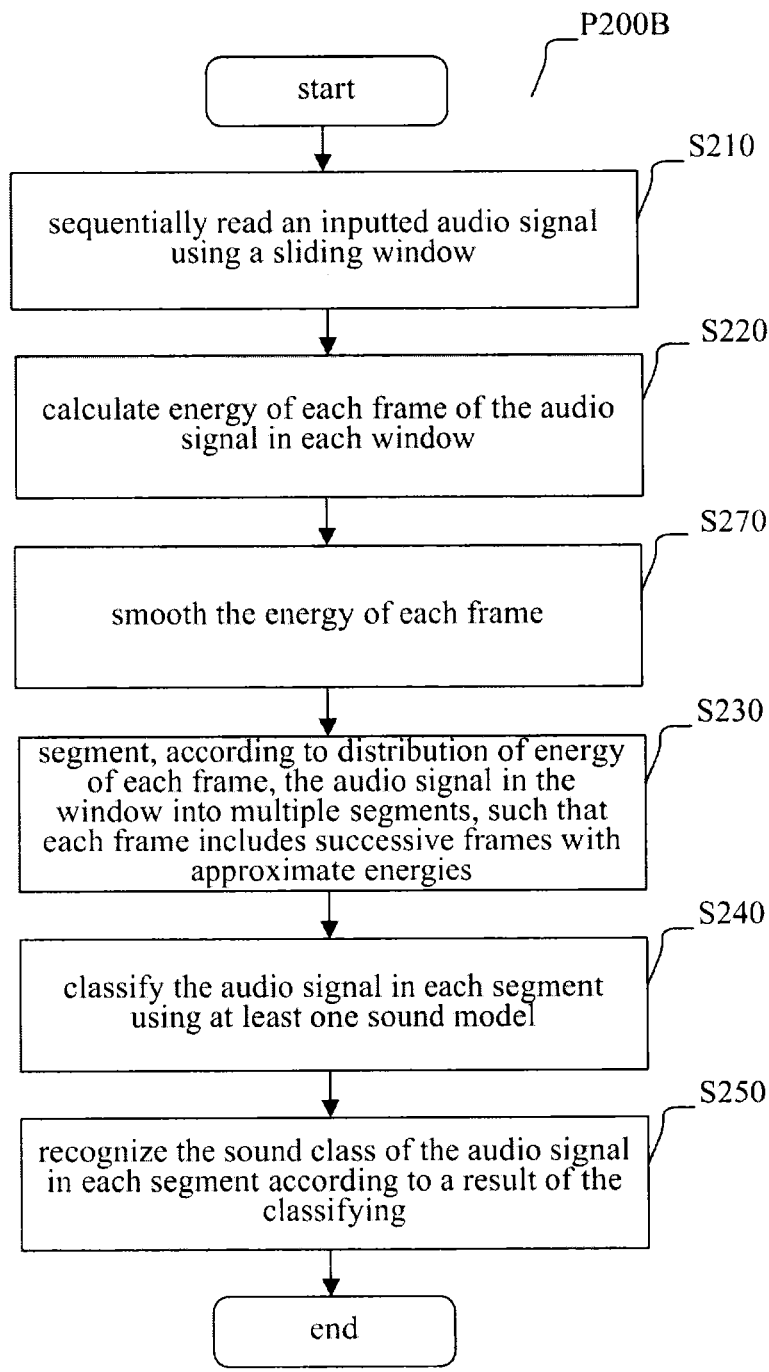
FIG. 10 shows a schematic operation flowchart of the audio signal processing apparatus shown in FIG. 9.

FIG. 10 shows a schematic operation flowchart of the audio signal processing apparatus shown in FIG. 9, i.e., an audio signal processing method according to still another embodiment of the invention. In this method P200B, the step S270 describes the function performed by the energy smoothing unit 170 described above.

Figure 11:
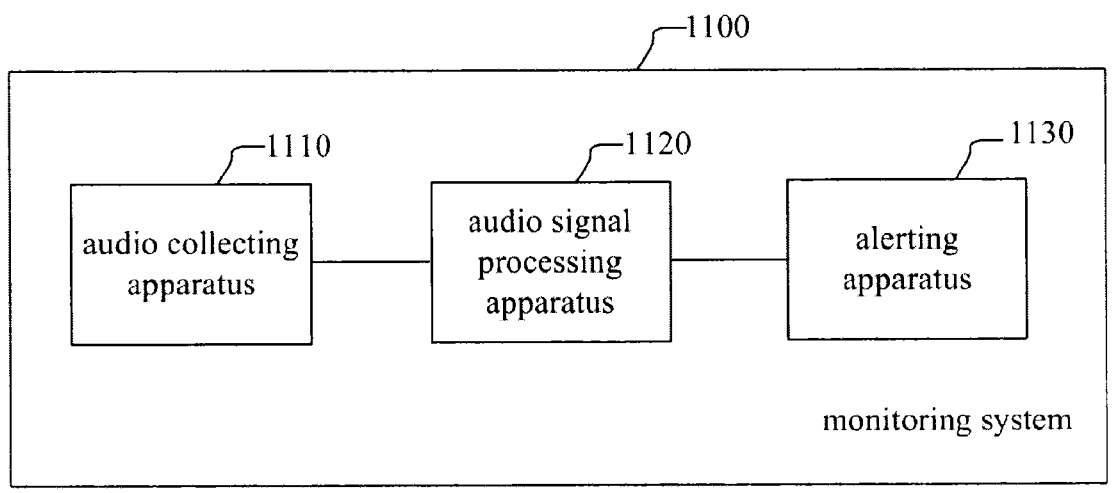
FIG. 11 shows a schematic block diagram of a monitoring system according to an embodiment of the invention.

The audio signal processing apparatus and method according to the embodiment described above of the invention may be applied to a monitoring system. FIG. 11 shows a schematic block diagram of a monitoring system according to an embodiment of the invention. As shown in FIG. 11, the monitoring system 1100 includes an audio signal collecting apparatus 1110, an audio signal processing apparatus 1120 and an alerting apparatus 1130. The audio signal collecting apparatus 1110 is configured to collect an audio signal. The audio signal processing apparatus 1120 is configured to process the audio signal to recognize sound classes contained in the audio signal. The alerting apparatus 1130 is configured to generate and transmit alert information when the audio signal processing apparatus 1120 recognizes that the audio signal includes a sound class of a predetermined type. Specifically, the audio signal processing apparatus 1120 may be implemented by any one of the audio signal processing apparatuses 100, 100A and 100B according to the embodiments of the invention described above. The audio signal collecting apparatus 1110 and the alerting apparatus 1130 can be configured using any existing technique or any appropriate technique to be developed, which is not described here in detail to avoid unnecessarily obscuring the scope of the invention.

It should be understood that the various component parts and units in the apparatuses of the embodiments of the invention may be configured in a way of software, firmware, hardware, or a combination thereof. Specific means or methods used in the configuring are well known to those skilled in the art and thus are not discussed here in detail. In the case of software or firmware, programs constituting the software are installed to a computer with a dedicated hardware structure from a storage medium or a network, and the computer can execute various functions when being installed with various programs.

Figure 12:
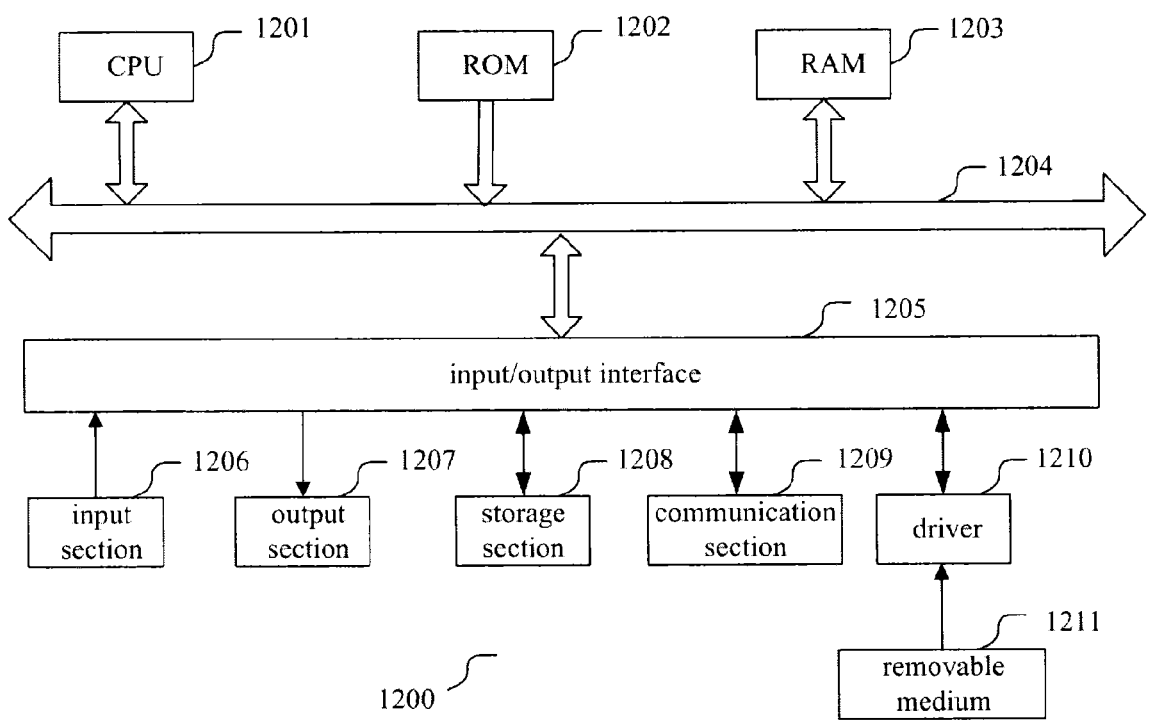
FIG. 12 shows an exemplary block diagram of the structure of a computer which can implement the embodiments/examples of the invention.

FIG. 12 shows an exemplary block diagram of the structure of a computer 1200 for implementing the embodiments/examples of the invention. In FIG. 12, a central processing unit (CPU) 1201 executes various processes according to programs stored in a read only memory (ROM) 1202 or programs loaded to a random access memory (RAM) 1203 from a storage section 1208. The RAM 1203 also stores data required when the CPU 1201 executes various processes and the like, if necessary. CPU 1201, ROM 1202 and RAM 1203 are connected to each other via a bus 1204. An input/output interface 1205 is also connected to the bus 1204.

The following components are connected to the input/output interface 1205: an input section 1206 (including a keyboard, a mouse, etc.), an output section 1207 (including a display such as a cathode ray tube (CRT) display and a liquid crystal display (LCD), and a speaker, etc.), a storage section 1208 (including a hard disk, etc.), a communication section 1209 (including a network interface card such as a LAN card, a modem). The communication section 1209 performs a communication process via a network such as Internet. According to needs, a driver 1210 may also be connected to the input/output interface 1205. A removable medium such as a disk, an optical disk, a magneto-optical disk or a semiconductor memory may be mounted on the driver 1210 as required, so that computer programs read therefrom are installed to the storage section 1208 as required.

In case of realizing the above-described series of processes by software, programs constituting the software are installed from a network such as Internet or from a storage medium such as the removable medium 1211.

Those skilled in the art should understand that such storage medium is not limited to the removable medium 1211 shown in FIG. 12 which stores thereon programs and is distributed separately from a device to provide programs to a user. Examples of the removable medium 1211 include disk (including a floppy disk (registered trademark)), CD (including compact disc read-only memory (CD-ROM) and digital versatile disc (DVD)), magneto-optical disk (including mini disc (MD) (registered trademark)) and a semiconductor memory. Alternatively, the storage medium may be the ROM 1202, or a hard disk contained in the storage section 1208, etc., which stores thereon programs and is distributed to the user together with a device containing it.

The invention also provides a program product which stores thereon machine-readable instruction codes. When the instruction codes are read and executed by a machine, the audio signal processing method described above according to the embodiments of the invention can be performed.

Accordingly, the storage medium for carrying the program product which stores thereon machine-readable instruction codes described above is also included in the invention. The storage medium includes but not limited to floppy diskettes, optical disks, magneto-optical disks, memory cards, memory sticks and so on.

In the foregoing description of the embodiments of the invention, features described and/or shown for one embodiment may be used in one or more other embodiments in a same or similar way, may be used in combination with features in other embodiments, or may replace features in other embodiments.

It should be emphasized that the term "include/comprise", when used herein, refers to the presence of features, elements, steps or components but does not preclude the presence or addition of one or more other features, elements, steps or components.

Furthermore, the method according to the invention is not limited to be executed according to the time order described in the specification, and can also be executed sequentially, in parallel or independently in accordance with another time order. Therefore, the order of execution of the method described in the specification does not constitute limitations to the technical scope of the invention.

While the embodiments of the invention are described above in detail in conjunction with drawings, it should be understood that the embodiments described above are merely for illustrating the invention and are not intended to limit the invention. For those skilled in the art, various modifications and alterations can be made to the embodiments described above without departing from the spirit and scope of the invention. Therefore, the scope of the invention is defined by only the appended claims and equivalent meanings thereof.

The invention claimed is:

1. An audio signal processing apparatus, comprising:
circuitry configured to
sequentially read an inputted audio signal using a sliding window;
calculate energy of each frame of the audio signal in each window;
segment, according to distribution of the energy of each frame of the audio signal in each window, the audio signal in the window into a plurality of segments, such that each segment comprises successive frames with approximate energies;
classify the audio signal in each segment using at least one sound model; and
recognize a sound class of the audio signal in each segment according to a result of the classification, wherein
the circuitry configured to segment is further configured to
cluster the energies of the frames in the window into a plurality of clusters according to magnitudes of the energies, each cluster containing a plurality of the energies whose magnitudes are approximate to each other; and
form successive frames in the same cluster into one segment.

2. The audio signal processing apparatus according to claim 1, wherein the circuitry configured to cluster is further configured to cluster an energy sequence of the window into two clusters according to a Nearest Neighbor Rule by taking a maximum energy and a minimum energy in the energy sequence of the window as centers, respectively, and iteratively cluster an energy sequence of each cluster according to the Nearest Neighbor Rule by taking a maximum energy and a minimum energy in the energy sequence of each cluster as centers, respectively, until a clustering condition is not satisfied any longer,
wherein a sequence comprised of the energies of the frames in the window serves as the energy sequence of the window, a sequence comprised of the energies of the frames in each cluster serves as the energy sequence of the cluster, and the clustering condition is that the sum of degrees of similarity between distributions of the energy sequences of the two clusters resultant from the clustering and Single Gaussian Distribution is higher by up to a predetermined extent than a degree of similarity between distribution of an energy sequence of a window or cluster from which the two clusters are clustered and the Single Gaussian Distribution.

3. The audio signal processing apparatus according to claim 1, wherein the circuitry configured to cluster is further configured to:
regulate a sequence comprised of the energies of the frames in the window before the clustering, so as to increase differences between the energies in the sequence.

4. The audio signal processing apparatus according to claim 1, wherein the circuitry is configured to:
classify each frame of the audio signal in each segment using an abnormal sound model and a background sound model;
perform weighting on a classification result for each frame by the circuitry according to a reliability that each frame belongs to abnormal sound, wherein a weight of the classification result is higher in the case that the reliability is greater; and
recognize the sound class of the audio signal in each segment according to the weighted classification result of each frame.

5. The audio signal processing apparatus according to claim 4, wherein the circuitry is configured to use any one of or a combination of any ones of the following three items as the reliability that each frame belongs to abnormal sound:
an energy change of each frame of the audio signal with respect to a previous frame of the audio signal,
a difference between a degree of similarity between each frame of the audio signal and the abnormal sound model and a degree of similarity between the frame of the audio signal and the background sound model, and
a number of successive frames contained in a segment where each frame lies.

6. The audio signal processing apparatus according to claim 1, wherein the circuitry is configured to smooth the energy of each frame of the audio signal in the window before the segmenting of the audio signal in the window.

7. An audio signal processing method, comprising:
sequentially reading an inputted audio signal using a sliding window;
calculating energy of each frame of the audio signal in each window;
segmenting by circuitry of an informating processing apparatus, according to distribution of the energy of the each frame of the audio signal in each window, the audio signal in the window into a plurality of segments, such that each segment comprises successive frames with approximate energies;
classifying the audio signal in each segment using at least one sound model; and
recognizing, by the circuitry, a sound class of the audio signal in each segment according to a result of the classifying,
wherein the step of segmenting includes
clustering the energies of the frames in the window into a plurality of clusters according to magnitudes of the energies, each cluster containing a plurality of the energies whose magnitudes are approximate to each other; and
forming successive frames in the same cluster into one segment.

8. The audio signal processing method according to claim 7, wherein the step of clustering comprises:
clustering an energy sequence of the window into two clusters according to a Nearest Neighbor Rule by taking a maximum energy and a minimum energy in the energy sequence of the window as centers, respectively, and iteratively clustering an energy sequence of each cluster according to the Nearest Neighbor Rule by taking a maximum energy and a minimum energy in the energy sequence of each cluster as centers, respectively, until a clustering condition is not satisfied any longer, wherein a sequence comprised of the energies of the frames in the window serves as the energy sequence of the window, a sequence comprised of the energies of the frames in each cluster serves as the energy sequence of the cluster, and the clustering condition is that the sum of degrees of similarity between distributions of the energy sequences of the two clusters resultant from the clustering and Single Gaussian Distribution is higher by up to a predetermined extent than a degree of similarity between distribution of an energy sequence of a window or cluster from which the two clusters are clustered and the Single Gaussian Distribution.

9. The audio signal processing method according to claim 7, further comprising:

regulating a sequence comprised of the energies of the frames in the window before the clustering, so as to increase differences between the energies in the sequence.

10. The audio signal processing method according to claim 7, wherein each frame of the audio signal in each segment is classified using an abnormal sound model and a background sound model, and the method further comprises:

performing weighting on a classification result for each frame according to a reliability that each frame belongs to abnormal sound, wherein a weight of the classification result is higher in the case that the reliability is greater, and wherein the sound class of the audio signal in each segment is recognized according to the weighted classification result of each frame.

11. The audio signal processing method according to claim 10, wherein any one of or a combination of any ones of the following three items is used as the reliability that each frame belongs to abnormal sound:

an energy change of each frame of the audio signal with respect to a previous frame of the audio signal, a difference between a degree of similarity between each frame of the audio signal and the abnormal sound model and a degree of similarity between the frame of the audio signal and the background sound model, and a number of successive frames contained in a segment where each frame lies.

12. The audio signal processing method according to claim 7, further comprising:

smoothing the energy of each frame of the audio signal in the window before the segmenting the audio signal in the window.

13. A monitoring system, comprising:

an audio collecting apparatus including first circuitry configured to collect an audio signal;

an audio signal processing apparatus including second circuitry configured to process the audio signal, so as to recognize sound classes comprised in the audio signal; and an alerting apparatus including third circuitry configured to generate and transmit alert information when the audio signal processing apparatus recognizes that the audio signal comprises a sound class of a predetermined type, wherein the second circuitry of the audio signal processing apparatus is configured to:

sequentially read the audio signal using a sliding window;

calculate energy of each frame of the audio signal in each window;

segment, according to distribution of the energy of each frame of the audio signal in each window, the audio signal in the window into a plurality of segments, such that each segment comprises successive frames with approximate energies;

classify the audio signal in each segment using at least one sound model; and recognize a sound class of the audio signal in each segment according to a result of the classified audio signal, wherein the second circuitry configured to segment is further configured to cluster the energies of the frames in the window into a plurality of clusters according to magnitudes of the energies, each cluster containing a plurality of the energies whose magnitudes are approximate to each other; and form successive frames in the same cluster into one segment.

14. A non-transitory computer readable medium that stores instructions which when being executed by a processor causes the processor to perform a method comprising:

sequentially reading an inputted audio signal using a sliding window;

calculating energy of each frame of the audio signal in each window;

segmenting, according to distribution of the energy of the each frame of the audio signal in each window, the audio signal in the window into a plurality of segments, such that each segment comprises successive frames with approximate energies;

classifying the audio signal in each segment using at least one sound model; and recognizing a sound class of the audio signal in each segment according to a result of the classifying, wherein the step of segmenting includes clustering the energies of the frames in the window into a plurality of clusters according to magnitudes of the energies, each cluster containing a plurality of the energies whose magnitudes are approximate to each other; and forming successive frames in the same cluster into one segment.

* * * * *